United States Patent [19]

Hall

[11] Patent Number: 4,662,858
[45] Date of Patent: May 5, 1987

[54] FRICTION GAME CALL

[76] Inventor: Terry P. Hall, P.O. Box 549, Murfreesboro, Ark. 71958

[21] Appl. No.: 818,531

[22] Filed: Jan. 13, 1986

[51] Int. Cl.$^4$ .............................................. A63H 5/00
[52] U.S. Cl. .................................................. 446/397
[58] Field of Search ....................... 446/397, 408, 418

[56] References Cited

U.S. PATENT DOCUMENTS 2,025,181  12/1935  Simon .................................... 446/397
4,003,159   1/1977  Piper ..................................... 446/397

Primary Examiner—Mickey Yu
Attorney, Agent, or Firm—Stephen D. Carver

[57] ABSTRACT

A wooden, hand-held, frictional two-piece turkey call. A generally cubical resonator block is provided with a central resonator hole extending partially interiorly of the block. An elongated, generally cylindrical striker rod has a smaller length end extending coaxially outwardly of the block resonator hole, and a longer length end extending outwardly of the resonator block from the opposite surface. A pair of transverse resonator holes extend interiorly of the block from opposite end surfaces thereof and terminate short of the central striker resonator hole. A pair of smaller diameter resonator communication holes connect the transverse resonator holes and the central striker resonator hole to aid in proper sound coloration. A generally cubical resonator board includes a plurality of spaced apart primary resonator chambers, communication between at least two of which is interiorly established by a separate transverse resonator chamber. The resonator board includes an upper frictional surface adapted to be properly chalked and then frictionally contacted by a desired end of the striker rod so as to produce turkey calls of the desired pitch, sound quality, duration, and intensity.

6 Claims, 58 Drawing Figures

U.S. Patent   May 5, 1987   Sheet 1 of 4   4,662,858
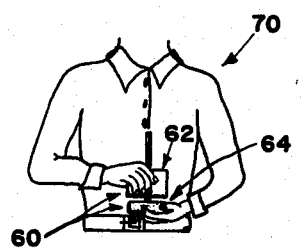
FIG.1
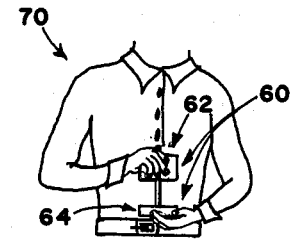
FIG.2
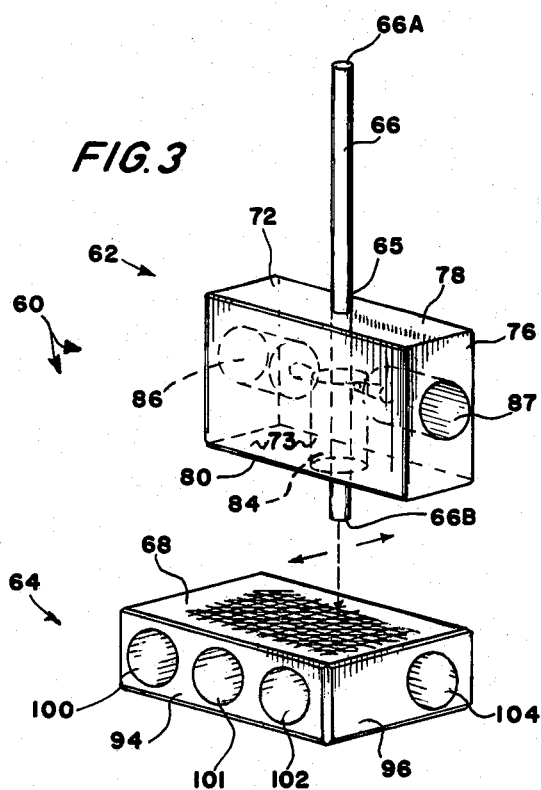
FIG.3
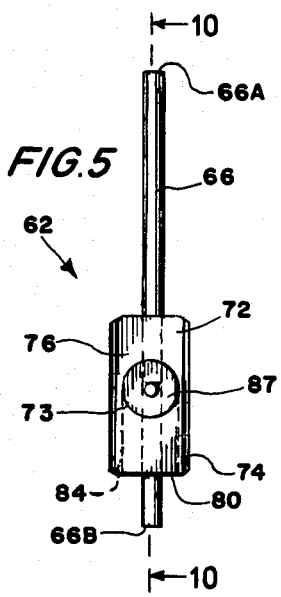
FIG.5
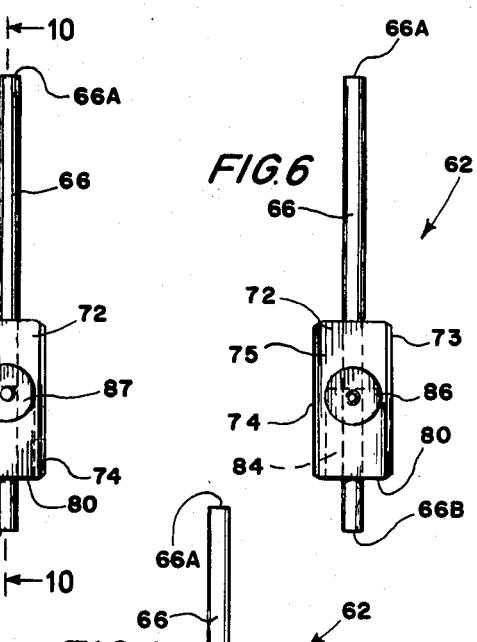
FIG.6
FIG.4
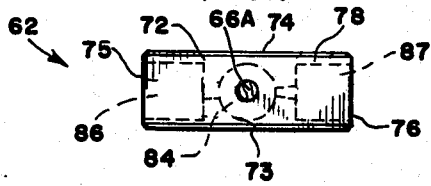
FIG.7
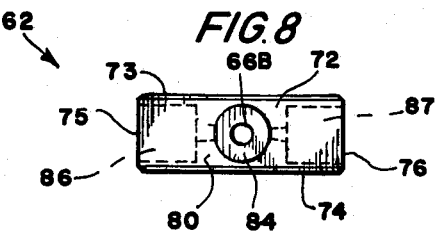
FIG.8

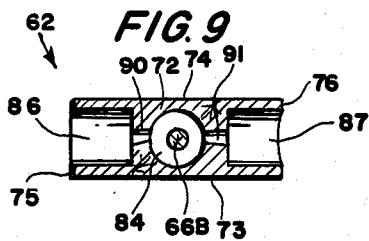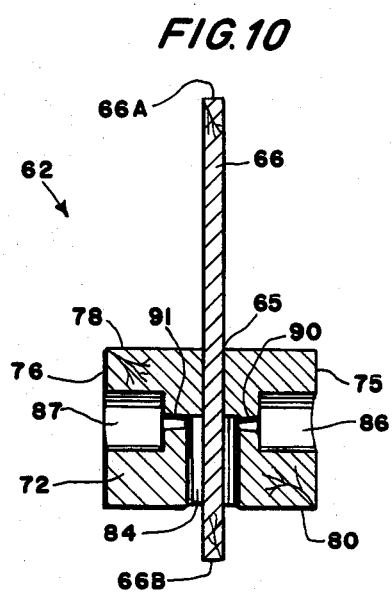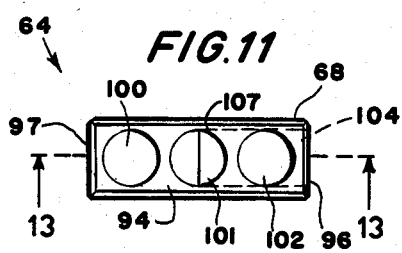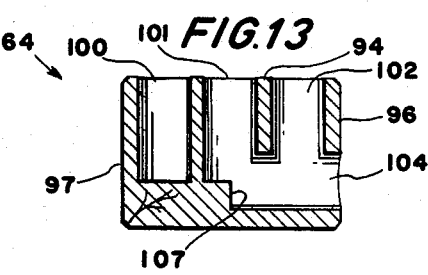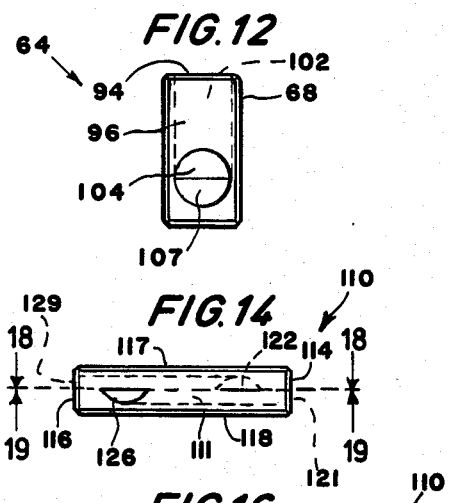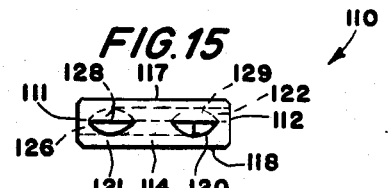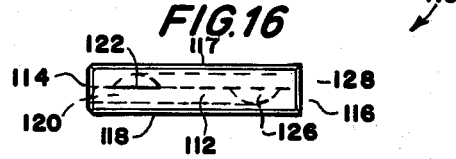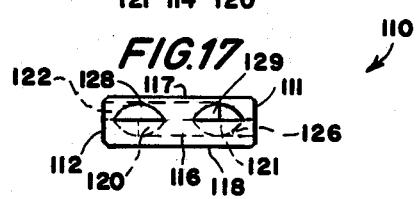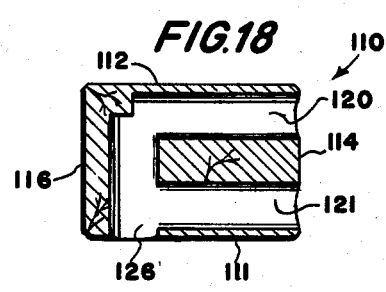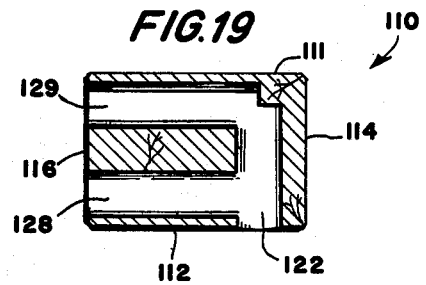

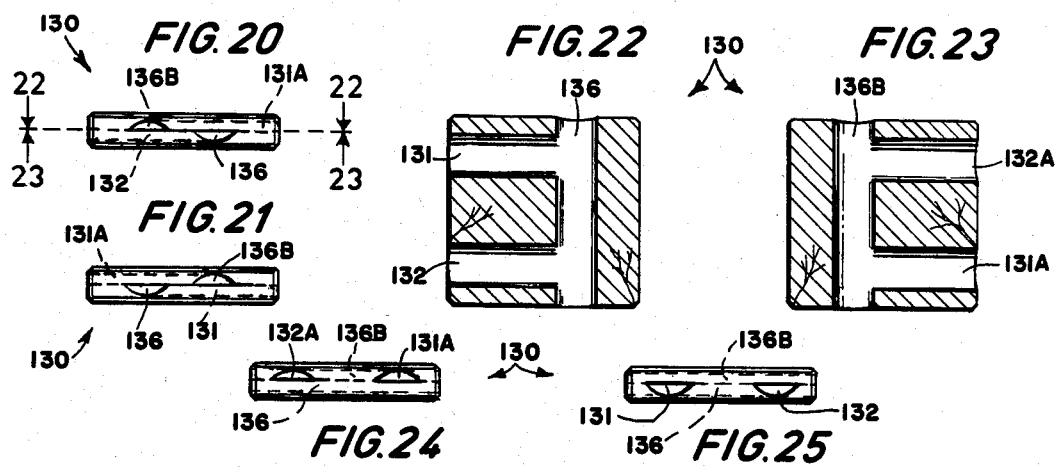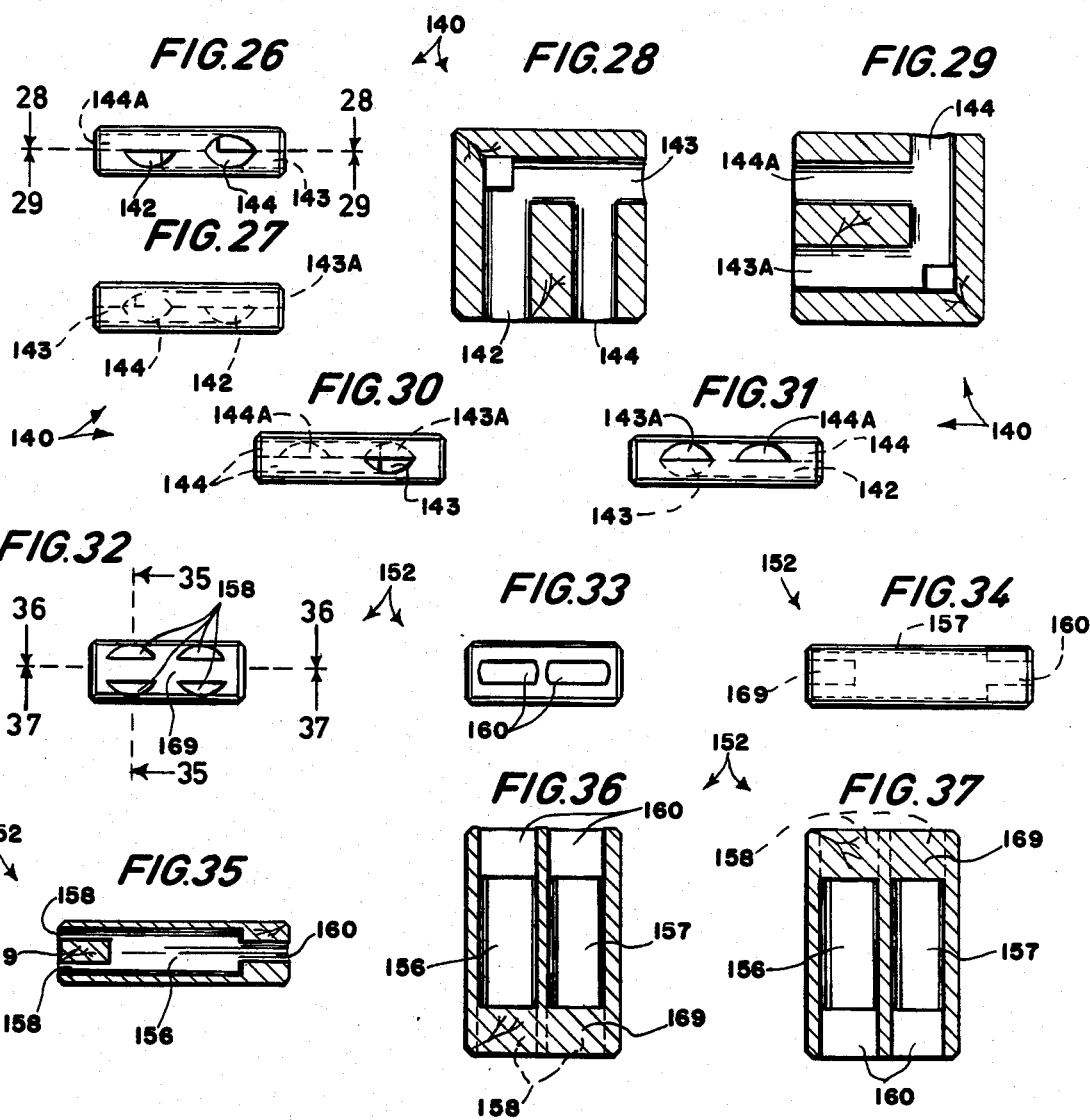

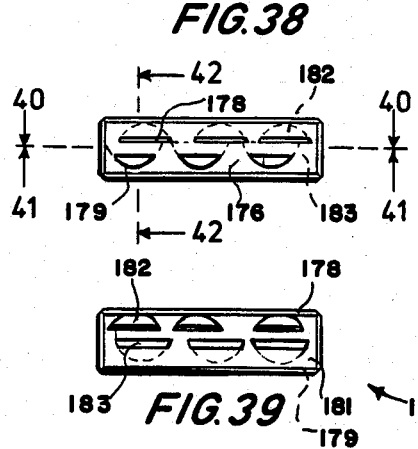
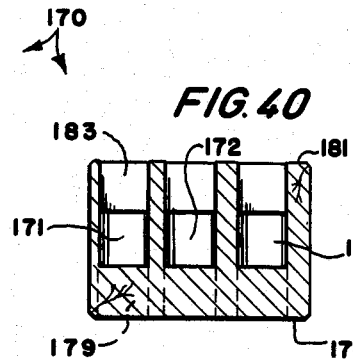
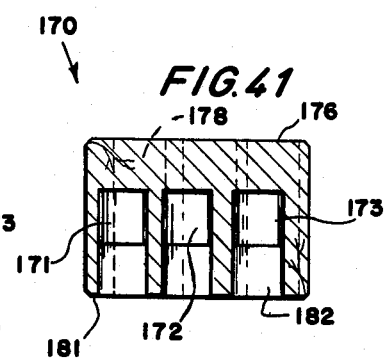
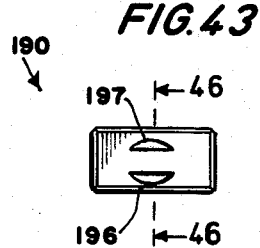
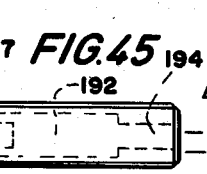
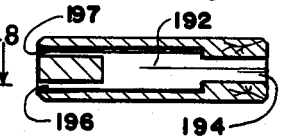
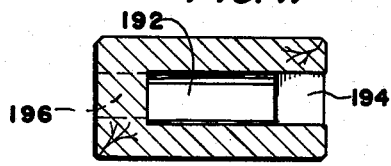
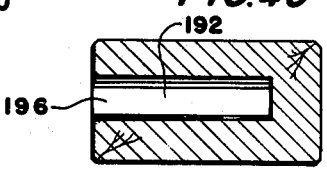
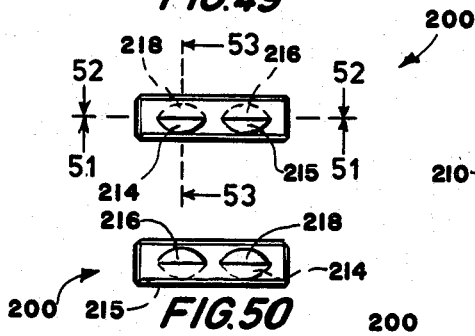
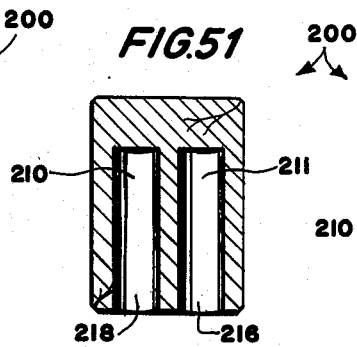
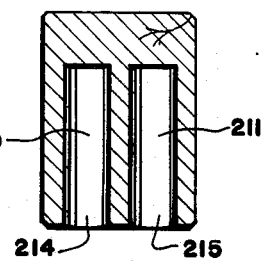
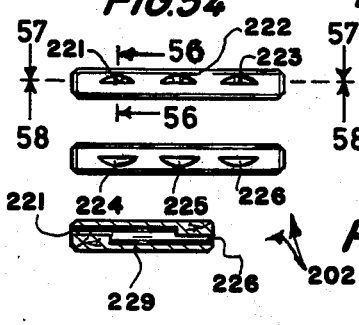
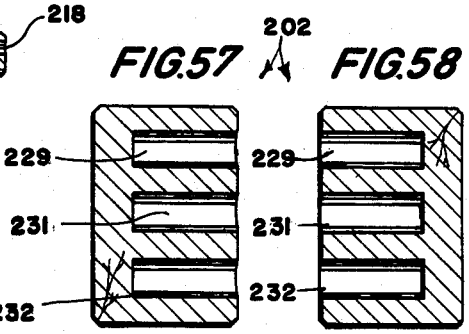

FRICTION GAME CALL

BACKGROUND OF THE INVENTION

The present invention relates generally to game calling apparatus. More particularly, the present invention is directly related to two piece game calls of he type including a preferably chalked resonator board apparatus which is adapted to be frictionally contacted by some form of frictional rubbing device.

A plurality of prior game calls are known in the turkey hunting arts. While a variety of "reed operated" game calls are known in the art, it is generally thought to be more desirable by experts to simulate the sound of turkeys or other game birds with frictional or "rubbing" resonator calls. Such calls generally include one or more resonator blocks, one of which may include a suitable point adapted to be frictionally rubbed against a preferably chalked rubbing surface of the sounding board member. One or more forms of resonator chambers and resonator holes have been known in the prior art to add coloration and sound quality to the various resonator pieces.

For example, U.S. Pat. No. 3,208,184 issued Sept. 28, 1965 to E. L. Wisor discloses a turkey call in which a striking rod emanates coaxially outwardly from a cylindrical resonator chamber, and it is adapted to be rubbed upon the friction surface of a cooperating, cylindrical resonator board. Jacobs in U.S. Pat. No. 4,310,986, issued Jan. 19, 1982 and Tannehill, U.S. Pat. No. 2,958,157 issued Nov. 1, 1960 disclose turkey callers of the same general structural type as Wisor.

Grayson, in U.S. Pat. No. 3,927,490 discloses a turkey call comprising an elongated, generally rectangular rubbing board adapted to be appropriately frictionally contacted to generate a unique turkey attractive call. The turkey caller of Anthony U.S. Pat. No. 3,367,064, issued Feb. 6, 1968, includes a resonator assembly with generally tubular characteristics having an inner, generally coaxially aligned, outwardly projecting, cylindrical, elongated striker rod. U.S. Pat. No. 3,716,943 issued to Orzetti on Feb. 20, 1973 is somewhat similar to Anthony.

The most relevant prior art known to me comprises U.S. Pat. No. 4,041,639 issued to Funk on Aug. 16, 1977. This turkey call comprises a generally cubical rubbing block from which an elongated striking rod extends outwardly. The rod is coaxially disposed within a resonator chamber bored into the resonator block, and the remote end of the striker rod is adapted to be frictionally rubbed across a working surface of a lower resonator box. Other forms of frictional "rubbing type" game calls are shown in U.S. Pat. Nos. 3,793,767, and 4,343,108. Both of the latter structures comprise reedless box type turkey calls.

To properly accomodate the hunter, however, a wide variety of turkey attracting sound must be capable of generation by suitable game calls. Most of the prior art devices of which I am aware are unable to accurately reproduce the wide variety of sounds which are required. While the prior box-like rubbing turkey calls such as those previously mentioned are extremely limited in the type and duration of sounds they can produce, many of the two piece resonator type friction systems known to me are also rather limited.

For example, at certain times of the year the "yelp", "cackle", and "lost" calls are necessary. Light "yelps" are known as "tree" calls. A "love" call can be simulated by three "yelps" in a row. The "lost" call is actually a sequence of continuous "yelps" which decrease and then increase in volume. The "putt" and "purr" sounds are also important. It is this particular type of sound which is very difficult to reproduce with known prior art devices. The putt and purr sounds of the present invention can be advantageously employed to properly emulate the "cutting" and "fighting" calls of wild turkey game birds.

Accordingly I have designed a system of extremely versatile and wide range sound generation characteristics, for easily reproducing the many game calls required for proper turkey hunting.

SUMMARY OF THE INVENTION

The present invention comprises a two piece frictional game call adapted to be manually employed by the hunter, to provide a variety of natural and life like sounds attractive to target birds such as turkeys or the like.

The apparatus is in two primary pieces. The first, a frictional striker assembly, is adapted to be manually rubbed against the second major piece, which comprises a resonator board. The striker assembly includes an elongated, cylindrical striker rod which penetrates a wooden, acoustic resonator block. The resonator block is generally in the form of a parallelepiped, and it preferably includes a central, generally cylindrical resonator hole through which the striker rod coaxially projects. Importantly, the striker rod includes a pair of ends, both of which project outwardly from the resonator block. However, the smaller end projects outwardly of the striker resonator hole, and the larger end projects away from the top surface of the resonator block.

Preferably the resonator block is equipped with a pair of spaced apart, axially aligned cylindrical resonator holes defined on its opposite end surfaces. These resonator holes both extend partially interiorly of the resonator block, and they provide certain acoustic sound qualities and amplification. The latter resonator holes are spaced apart from one another, and are oriented generally perpendicularly with respect to both the striker rod and the striker resonator hole through which the rod projects. Preferably a pair of reduced diameter, elongated resonator communication holes are drilled into the resonator block so that the transverse resonator holes are brought into acoustic communication with both the striker resonator hole and with one another.

A variety of resonator board constructions are depicted within the present invention. In the preferred mode however, the resonator board preferably comprises a generally rectangular, wooden resonator board in the form of a flat, parallelepiped. Preferably a plurality of spaced apart and parallel primary resonator chambers are drilled into a first side of a resonator board, and these chambers extend through the majority of the width of the resonator board. A generally transverse resonator chamber is provided to "color" generated sounds. The resonator chamber preferably extends transversely interiorly of the resonator block, and communicates between at least two of the primary resonator chambers. Preferably this transverse chamber terminates short of at least one of the primary resonator chambers. A variety of other forms of resonator board chamber designs are depicted herein.

It is preferred that the upper surface of the resonator board by properly chalked, and thereafter the resonator board may be manually held and firmly supported by being drawn into contact with the stomach muscles. Afterwards the resonator block is manually grasped and either the long end or the short end of the resonator block striker rod is chosen to frictionally contact the rubbing surface of the lower resonator board, depending upon the sounds desired. The small end of the striker may be employed to generate "yelp", "cackle", and "lost" calls. However, the large end may be advantageously employed to generate the required "putt" and "purr" calls which are characteristic of wild turkeys.

Thus a borad object of the present invention is to provide a high quality turkey call which is adapted to produce a wide variety of turkey sounds and noises.

A more particular object of the present invention is to provide a wooden, two piece, striker type turkey call of the character described which will appropriately color its sound as desired by the skilled operator.

Another object of the present invention is to provide a plurality of resonator boards adapted for use with frictional turkey calls.

A still further object of the present invention is to provide a reedless, two-piece frictional turkey call of the character described having a unique resonator block capable of producing both the "yelp" sounds and the "putt" and "purr" sounds required in turkey hunting.

Yet another object of the present invention is to provide a wooden, reedless two piece frictional turkey call of the character described which may be conveniently transported by the hunter and employed in the field with a minimum of maintenance and inconvenience.

Yet another object of the present invention is to provide a turkey caller of the character described which produces a plurality of turkey calls.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a fragmentary pictorial view illustrating the preferred handling of the caller in the present invention, with the apparatus deployed so as to produce "yelp" calls and the like;

FIG. 2 is a fragmentary pictorial view similar to FIG. 1, but showing the proper orientation of the apparatus in such a way so as to produce "putt and purr" and similar game sounds;

FIG. 3 is an exploded, isometric view of a two piece reedless frictional turkey caller constructed in accordance with the best mode of the present invention;

FIG. 4 is a front plan view of the striker assembly of FIG. 3;

FIG. 5 is a right side elevational view of the striker assembly;

FIG. 6 is a left side elevational view of the striker assembly;

FIG. 7 is a top plan view of the striker assembly;

FIG. 8 is a bottom plan view of the striker assembly;

FIG. 9 is a sectional view taken generally along line 9—9 of FIG. 4;

FIG. 10 is a longitudinal sectional view taken generally along line 10—10 of FIG. 5;

FIG. 11 is a front elevational view of the preferred resonator board illustrated in FIG. 3;

FIG. 12 is an end view of the resonator board, as viewed from a position generally to the right of FIG. 3;

FIG. 13 is a sectional view taken generally along line 13—13 of FIG. 11;

FIG. 14 is a front elevational view of an alternative resonator board;

FIG. 15 is an end view of the alternative resonator board of FIG. 14, as viewed from a position generally to the right of FIG. 14;

FIG. 16 is a rear elevational view of the resonator board of FIGS. 14 and 15, showing the side opposite of that shown in FIG. 14;

FIG. 17 is an end view of the resonator board of FIGS. 14-16, as viewed from a position generally to the left of FIG. 14;

FIG. 18 is a sectional view taken generally along line 18—18 of FIG. 14;

FIG. 19 is a sectional view taken generally along 19—19 of FIG. 14;

FIG. 20 is a front elevational view of an alternative embodiment of a resonator board;

FIG. 21 is a rear view showing the board of FIG. 20;

FIG. 22 is a sectional view taken generally along line 22—22 of FIG. 20;

FIG. 23 is a sectional view taken generally along line 23—23 of FIG. 20;

FIG. 24 is an end view of the resonator board as viewed from a position generally to the right of FIG. 20;

FIG. 25 is an end view of the resonator board as viewed from a position generally to the left of FIG. 20;

FIG. 26 is a front elevation view of another alternative embodiment of a resonator board;

FIG. 27 is a rear elevational view of the alternative embodiment of FIG. 26;

FIG. 28 is a sectional view taken generally along line 28—28 of FIG. 26;

FIG. 29 is a sectional view taken generally along line 29—29 of FIG. 26;

FIG. 30 is a plan view illustrating the right end of the resonator board of FIGS. 26-29;

FIG. 31 is a plan view showing the left end of FIG. 26;

FIG. 32 is an elevational view illustrating the front of an alternative embodiment of a resonator board;

FIG. 33 is a rear elevational view illustrating of the resonator board in FIG. 32;

FIG. 34 is a right side elevational view of the resonator board of FIG. 32;

FIG. 35 is a sectional view taken generally along line 35—35 of FIG. 32;

FIG. 36 is a sectional view taken generally along line 36—36 of FIG. 32;

FIG. 37 is a sectional view taken generally along line 37—37 of FIG. 32;

FIG. 38 is an front view of a further embodiment of a resonator board;

FIG. 39 is a rear view of the board of FIG. 38;

FIG. 40 is a sectional view taken generally along line 40—40 of FIG. 38;

FIG. 41 is a sectional view taken generally along line 41—41 of FIG. 38;

FIG. 42 is a sectional view taken generally along line 42—42 of FIG. 38;

FIG. 43 is an front elevational view of a small embodiment of a resonator board;

FIG. 44 is a rear elevational view of the embodiment as shown in FIG. 43;

FIG. 45 is a right end view of the embodiment of FIG. 43;

FIG. 46 is a sectional view taken generally along line 46—46 of FIG. 43;

FIG. 47 is a sectional view taken generally along line 47—47 of FIG. 45;

FIG. 48 is a sectional view taken generally along line 48—48 of FIG. 45;

FIG. 49 is a front elevational view of another embodiment of the present resonator board;

FIG. 50 is a rear elevational view of the embodiment as shown in FIG. 49;

FIG. 51 is a sectional view taken generally along line 51—51 of FIG. 49;

FIG. 52 is a sectional view taken generally along line 52—52 of FIG. 49;

FIG. 53 is a sectional view taken generally along line 53—53 of FIG. 49;

FIG. 54 is a front elevational view of still another embodiment of a resonator board;

FIG. 55 is a rear elevational view of the embodiment shown in FIG. 54;

FIG. 56 is a sectional view taken generally along line 56—56 of FIG. 54;

FIG. 57 is a sectional view taken generally along line 57—57 of FIG. 54; and,

FIG. 58 is a sectional view taken generally along line 58—58 of FIG. 54.

DETAILED DESCRIPTION OF THE DRAWINGS

With reference now to the appended drawings, a reedless, two piece frictionally operated hand held turkey call constructed in accordance with the best mode of the present invention has been generally designated by the reference numeral 60. Call 60 comprises a frictional striker block assembly generally indicated by the reference numeral 62, and a cooperating, lower resonator board generally indicated by the reference numeral 64. The associated elongated striker rod 66 is adapted to be rubbed across the upper frictional surface 68 of the resonator board 64 to produce a plurality of game sounds.

As indicated in FIGS. 1 and 2, it is preferred that the hunter or outdoorsman 70 employing the apparatus will position the resonator board 64 beneath the frictional striker block 62, and the resonator board 64 is preferably drawn into the stomach muscles of the user 70. At this time the frictional striker block 62 is moved so that the desired end of the striker rod 66 may be rubbed against the frictional surface 68 of the resonator board 64. Preferably surface 68 is appropriately chalked in a conventional fashion prior to use.

With reference primarily directed now to FIGS. 3-10, the frictional striker block assembly 62 comprises a rigid, generally cubicle resonator block portion 72 which is preferably machined from wood such as walnut, cherry or the like and which is in the form of a rectangular parallelepiped. The block 72 comprises a front face 73 and an opposite rear face 74 which are spaced apart from one another in generally parallel relation. Similarly, an end surface 76 is spaced apart from an opposite end surface 75, and both of the ends 75, 76 are transversely oriented relative to the top surface 78 and the bottom surface 80 of the block 72.

The elongated striker rod 66 is preferably made of wood such as pine or the like. It is generally cylindrical, and it includes a pair of tapered, gently pointed ends, broadly designated by the reference numerals 66A and 66B. The elongated striker rod 66 includes a rod center generally designated by the reference numeral 65 which is positioned substantially adjacent to the top surface 78 of the block 72.

The rod ends extend outwardly from the center of the rod and away from the wooden resonator block 72. The rod 66 extends generally through the center of the block 72, and rod end 66A projects upwardly away from block surface 78. The lower rod end 66B extends a lesser distance away from the bottom surface 80 of the block 72 (FIGS. 8 and 10).

For acoustic purposes a plurality of generally cylindrical resonator holes are bored into the resonator block 72. A first, centrally located resonator hole 84 extends from the bottom surface 80 of the block approximately half way up into the interior thereof, and it terminates at approximately the center of the block. As best viewed in FIGS. 7-9, the striker rod 62 is generally coaxially positioned relative to the resonator hole 84, and its shorter end 66B projects immediately out of the hole 84.

It will also be noted that block 72 preferably comprises a pair of spaced-apart, generally transversely oriented cylindrical resonator holes 86, 87 which extend approximately half way into the interoir of the block 72, and which terminate short of the first resonator hole 84. However, as seen in FIG. 9, these resonator holes 86, 87 are acoustically interconnected with the resonator hole 84 by a pair of internal resonator communication holes 90, and 91. Holes 90 and 91 comprise reduced diameter bores which are axially aligned with one another approximately at the center of block 72. Moreover, these communication holes are of a diameter substantially less than the diameter of the transverse holes 86 or 87.

Desired acoustic effects are enhanced by the intercommunication of the various resonator holes, and desired sound coloration and amplification results through the disclosed construction in response to rubbing of either end of the rod 66 upon the chalked surface 68. Specifically, it is preferred that the resonator block is approximately block 1.5 inches wide, $\frac{1}{2}$ inch thick, and 1 inch high. Preferably the resonator holes are each of a $\frac{3}{8}$ inch diameter, and the transverse resonator holes are approximately $\frac{3}{8}$ inch deep. The central resonator hole 84 is $\frac{5}{8}$ inches deep, and its edges are spaced from the bottoms of the cooperating transverse resonator holes by approximately $\frac{1}{8}$ inch. The transverse holes 90 and 91 in the resonator block are approximately $\frac{1}{8}$ inch in diameter. The dimensions of the preferred resonator board 64 are approximately 1 and 7/16 inches by 1 inch by $\frac{1}{2}$ inch, and the resonator chambers are all of an approximately $\frac{3}{8}$ inch diameter. The bores 100, 101 extend at least $\frac{5}{8}$ of the way into the board as in FIG. 13, and the lower transverse resonator chamber extends approximately one half way into the board.

With reference now directed to FIGS. 3 and 11-13, the preferred resonator board 64 is thereshown. The flat board 64 is preferably comprised of wood such as cherry or walnut, and it includes a primary side 94 separated from a pair of flat, extreme opposite, parallel ends 96, 97. A plurality (nominally three) of primary resonator chambers 100-102 are bored into the resonator block side 94. Chamber 100 extends interiorly of the block, but it terminates short of the termination point of the associated primary resonator chamber 102.

It will be noted from FIG. 13 that board end 96 has been provided with a transverse, secondary resonator chamber 104 which extends into communication with the base of primary resonator chambers 101 and 102. As best viewed in FIG. 12, the base region of resonator chamber 101 is somewhat blocked by an intermediate dam 107, which is employed to achieve desired acoustic coloration and effects.

With reference directed now to FIGS. 14-19, an alternative resonator board has been generally designated by the reference numeral 110. Board 110 includes a pair of spaced apart sides 111, 112 and a pair of spaced apart ends 114, 116. Block 110 includes a top 117 and a bottom 118, either of which may be appropriately chalked and appropriately frictionally rubbed by the previously discussed striker rod 66 to produce desired acoustic effects. Through the end 114 of the board 110 a pair of primary resonator chambers 120 and 121 are intercommunicated by a cooperating, transverse resonator chamber 126. As noted in FIG. 14 the input to chamber 126 communicates through side 111 and is crescent shaped (preferably all input ports employed are of a similar crescent shape). A similar pair of upper primary resonator chambers 128, 129 (FIG. 19) are intercommunicated by a transverse bore 122. Similar chambers 128, 129 communicate through end 116 to primary chambers 120 and 121.

In FIGS. 20-25 another alternative embodiment of a resonator board has been generally designated by the reference numeral 130. Board 130 includes a pair of lower primary sound chambers 131, 132 communicating through the lower portion of one end, and a similar cooperating pair of sound chambers 131A, 132A communicating through the upper portion of the opposite end. Preferably the latter sound chambers 131A, 132A terminate in a transverse sound chamber 136B as do chambers 131,132 which terminate in transverse sound chamber 136. The spaced apart, cooperating companion transverse channels 136, 136B provide tone and quality as designed by the user.

FIGS. 26 through 31 illustrate yet another alternative embodiment of a sounding board has been generally designated by the reference numeral 140. Two pairs of primary resonator chambers have been employed by both "halves," and each pair is interconnected by at least a portion of a transverse chamber. Primary chambers 142 and 144 are connected by a transverse chamber 143 as are primary chambers 143A, 144A connected by transverse chamber 144. The cooperating chamber 144A is coupled acoustically across channels 142 and 144 allowing the lower and upper portions of chambers 143 and 143A to align.

With reference now to FIGS. 32-37, an alternative embodiment 152 of a sounding block assembly includes a pair of internal spaced apart resonator chambers 156, 157 which communicate with the outside through pairs of spaced apart crescent shaped ports 158 provided through the end surface 169. The opposite end of the chambers 156, 157 provides communication through similar ports 160, (FIG. 35) both of which communicate with the substantially hollow interiors 156, 157 of the chamber.

FIGS. 38-42 show three spaced apart internal chambers, generally designated by the reference numerals 171, 172, and 173, which are provided in the alternative sounding block 170. Each of these chambers communicates with the outside at first end 176 laterally offset ports comprising slots 178 and spaced apart crescent shaped orifices 179. The relationship between the slots and crescent ports is reversed on the opposite end 181 wherein it will be noted that crescents 182 are now spaced apart from the cooperating slots 183. As viewed in FIG. 42 it will be noted that each of the chambers such as chamber 172 has a slot on its upper side at one end, and a slot on the lower side at the opposite end. The crescent ports are similarly reversed in position, and on each side the crescent end slotted ports are staggered as illustrated in FIGS. 38, 39.

With reference to FIGS. 43-48, an alternative embodiment of a friction block assembly has been generally designated by the reference numeral 190. Block 190 includes a central internal resonator chamber 192 which is ported at one end of block 190 in a relatively large orifice 194, and at its opposite end in a pair of spaced apart, crescent shaped ports 196, 197.

The alternative embodiment 200 shows in FIGS. 49-52 is very similar to embodiment 202 in FIGS. 54-58. In each instance a plurality of parallel spaced apart sounding chambers such as chambers 210, 211 or chambers 212-214 extend through the apparatus. In both instances, either embodiments 200, or 202 employ crescent shaped ports of one orientation at opposite sides, and the orientation level of the crescent ports is reversed. Hence crescent shaped ports 214, 215 have reversed counterparts 216, 218 at the opposite end of the friction block (FIG. 53). It will also be noted that communicative but separate chambers 210 and 211 are formed.

Similarly, internal crescent ports 221, 222 and 223, are "reversed" from crescent shaped ports 224 through 226 at opposite ends of the friction block (FIG. 56). Thus crescent shaped ports 224 through 226 (FIG. 55) are reversed from the orientation of FIG. 54. Thus in FIG. 53 a central larger diameter chamber regions 229, 231, 232 will be noted, which is in communication with but generally separate from the reduced dimension crescent shaped ports discussed.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated and is within the scope of the claims.

As may possible embodiments may be made of the invention without departing from the scope thereof, it is to be understood that all matter herein set forth or shown in the accompanying drawings is to be interpreted as illustrative and not in a limiting sense.

What is claimed is:

1. A game call for use by hunters, outdoorsmen, or the like for attracting wild turkeys or similar game birds, the game call comprising:

a striker assembly adapted to be manipulated manually by the user of said call, said striker assembly comprising:

an elongated, cylindrical striker rod having first and second integral, spaced apart ends and a center; and, a resonator block for coloring and amplifying tones generated by said striker rod, said block being generally in the form of a parallelepiped and having a center, said striker rod penetrating said resonator block substantially at the block center with said rod center being spaced apart from said block center such that said first rod end projects outwardly from said block a greater distance than said second rod end, said resonator block comprising a central, cylindrical resonator hole for affecting the sound quality characteristics of said call, said central hole extending from a top surface of said block inwardly to approximately the center of said resonator block, and said striker rod second end coaxially penetrating said central hole; and wherein said resonator block further comprises a pair of spaced-apart, axially aligned transverse resonator holes defined in opposite end surfaces of said block which extend partially interiorly of said block in generally perpendicular relation to said central resonator hole; and, a wooden resonator board for producing game attractive noises in cooperation with said striker assembly in response to frictional contact with said striker rod, said board comprising a top rubbing surface adapted to be selectively chalked and then rubbed by either end of said striker rod to produce game attracting noises, said board comprising a plurality of resonator chambers for coloring and amplifying sounds.

2. The call as defined in claim 1 including a pair of internally defined, generally coaxial resonator communication holes extending from said transverse resonator holes to said central resonator hole.

3. The call as defined in claim 2 wherein:

said resonator board includes a pair of spaced apart, parallel ends, a pair of spaced apart side surfaces both of which are oriented generally perpendicularly with respect to said last mentioned ends, a bottom parallel with said top rubbing surface and spaced apart therefrom; and, said plurality of resonator chambers in said board comprises at least two, cylindrical, spaced apart primary resonator chambers defined in said board between said top rubbing surface and said bottom perpendicular to said sides, and a transverse resonator chamber extending into said board parallel with said top and bottom and perpendicular with respect to said ends, wherein said transverse chamber extends interiorly of said board into communication with at least two of said plurality of spaced apart primary resonator chambers.

4. The call as defined in claim 3 wherein said resonator board comprises a pair of dissimilar, laterally offset and spaced apart inlet ports associated with said primary resonator chambers.

5. The call as defined in claim 4 wherein said resonator board comprises:

a plurality of internally spaced apart, generally parallel resonator chambers extending all the way through said block from a first end surface to an opposite, spaced apart end surface;

the first end surface having a plurality of chamber inlet ports defined below the center of the resonator board, one for each chamber; and, the opposite end surface having a plurality of chamber inlet ports defined therein above the center of the resonator board, one for each chamber wherein said chambers comprise a relatively large diameter central chamber portion and a pair of reduced volume end chamber portions extending between the inlet ports and said central chamber portion.

6. A frictional, manually operated turkey call for hunters, outdoorsmen, or the like, said turkey call comprising:

a striker assembly adapted to be manipulated manually by the user of said call, said striker assembly comprising:

an elongated, cylindrical striker rod having first and second integral, spaced apart ends and a center; and, a resonator block for coloring and amplifying tones generated by said striker rod, said block being generally in the form of a parallelepiped and having a center, said block comprising:

a pair of spaced-apart, transverse resonator holes defined in opposite end surfaces of said block for affecting the sound quality characteristics of said call;

wherein said striker rod penetrates said resonator block with said first end being longer than said second end, said resonator block comprising at least one generally cylindrical striker rod resonator hole and said striker rod coaxially penetrating said hole and emanating therefrom, said first rod end extending from a top surface of said block inwardly to said center of said resonator block, and said second rod end being associated with said striker rod resonator hole;

wherein said transverse resonator holes extend partially interiorly of said block in generally perpendicular relation to said striker rod resonator hole and terminate short thereof; and, a pair of internal, generally coaxial resonator communication holes extending from said transverse resonator holes to said striker rod resonator hole; and, a wooden resonator board for producing game attractive noises in cooperation with said striker assembly in response to frictional contact with said striker rod, said board being in the form of a parallelepiped and comprising:

a top rubbing surface adapted to be selectively chalked and then rubbed by either end of said striker rod to produce game attracting noises;

a bottom parallel with said top rubbing surface and spaced apart therefrom;

a pair of spaced apart, parallel ends, and a pair of spaced apart side surfaces both of which are oriented generally perpendicularly with respect to said last mentioned ends;

a plurality of resonator chambers in said board comprising at least two, cylindrical, spaced apart primary resonator chambers defined in said block between said top rubbing surface and said bottom perpendicular to said sides, and a transverse resonator chamber extending into said board parallel with said top and bottom and perpendicular with respect to said ends, wherein said transverse chamber extends interiorly of said board into communication with at least two of said plurality of spaced apart primary resonator chambers; and, wherein said resonator board comprises a pair of dissimilar, laterally offset and spaced apart inlet ports associated with said primary resonator chambers.

* * * * *